United States Patent [19]
Kasubke

[11] Patent Number: 5,704,574
[45] Date of Patent: Jan. 6, 1998

[54] CLAMPING RING WITH HOLDING AND SUPPORTING STRAPS

[75] Inventor: Volker Kasubke, Neunkirchen, Germany

[73] Assignee: Hydac Befestigungstechnik GmbH, Saarbrucken, Germany

[21] Appl. No.: 603,600

[22] Filed: Feb. 21, 1996

[30] Foreign Application Priority Data

May 18, 1995 [DE] Germany ............. 195 18 309.6

[51] Int. Cl.$^6$ ........................................ F16L 3/12
[52] U.S. Cl. ............... 248/74.3; 248/74.2; 248/316.1
[58] Field of Search ............... 248/69, 74.1, 74.2, 248/74.3, 316.1

[56] References Cited

U.S. PATENT DOCUMENTS

| | | | |
|---|---|---|---|
| 928,711 | 7/1909 | Taft | 248/74.3 |
| 1,085,421 | 1/1914 | Hiller | |
| 1,187,430 | 6/1916 | Kenly | |
| 1,641,559 | 9/1927 | Thompson | |
| 2,277,738 | 3/1942 | Wilkinson | |
| 2,395,745 | 2/1946 | King | |
| 2,677,866 | 5/1954 | Tetzleff | |
| 2,845,681 | 8/1958 | Graef | 24/279 |
| 2,895,748 | 7/1959 | Oldham | 295/410 |
| 3,632,069 | 1/1972 | Thayer | 248/56 |
| 4,061,299 | 12/1977 | Kurosaki | 248/73 |
| 4,125,240 | 11/1978 | Heard | 248/218.4 |
| 4,382,570 | 5/1983 | Craig | |
| 4,445,255 | 5/1984 | Olejack | 24/284 |
| 4,783,029 | 11/1988 | Geppert et al. | 248/74.1 |
| 4,858,860 | 8/1989 | Richards | 248/62 |
| 5,474,269 | 12/1955 | Kasuhke | 248/74.1 |

FOREIGN PATENT DOCUMENTS

| | | |
|---|---|---|
| 286561 | 10/1988 | European Pat. Off. |
| 0508050 | 10/1992 | European Pat. Off. |
| 0508331 | 10/1992 | European Pat. Off. |
| 674127 | 1/1930 | France |
| 2519405 | 7/1983 | France |
| 2535823 | 5/1984 | France ............ 248/74.1 |
| 2578573 | 9/1986 | France |
| 1108019 | 5/1961 | Germany |
| 1947749 | 10/1966 | Germany |
| 6931027 | 7/1969 | Germany |
| 3346423 | 8/1984 | Germany |
| 3522497 | 1/1987 | Germany |

*Primary Examiner*—Robert W. Gibson, Jr.
*Assistant Examiner*—Stephen S. Wentsler
*Attorney, Agent, or Firm*—Roylance,Abrams,Berdo & Goodman, L.L.P.

[57] ABSTRACT

A clamping ring has a flexible holding strap and a pivotal locking mechanism on the holding strap. A holding member has two apertures for receiving the holding strap. The apertures are arranged in reorientation points where the holding member is converted at each end into a foot part. A supporting strap engages at least partially on the holding strap and faces toward the interior of the clamping ring. The apertures are completely surrounded by the holding member. The holding member has a curved installation point or breakpoint in its middle bearing part between its two foot parts. The middle bearing part engages the holding strap and is arranged between the holding strap and a supporting strap. Between the holding strap free ends and the holding member, the supporting strap engages the holding strap and is connected with the holding strap in the area of their free ends. This clamping ring can be adapted to a plurality of different types of bodies, especially tubular bodies, and can be received even at points with cramped structural space. The holding strap, together with the supporting strap and the locking mechanism, can be moved longitudinally as desired along the curve of the clamping ring.

5 Claims, 2 Drawing Sheets

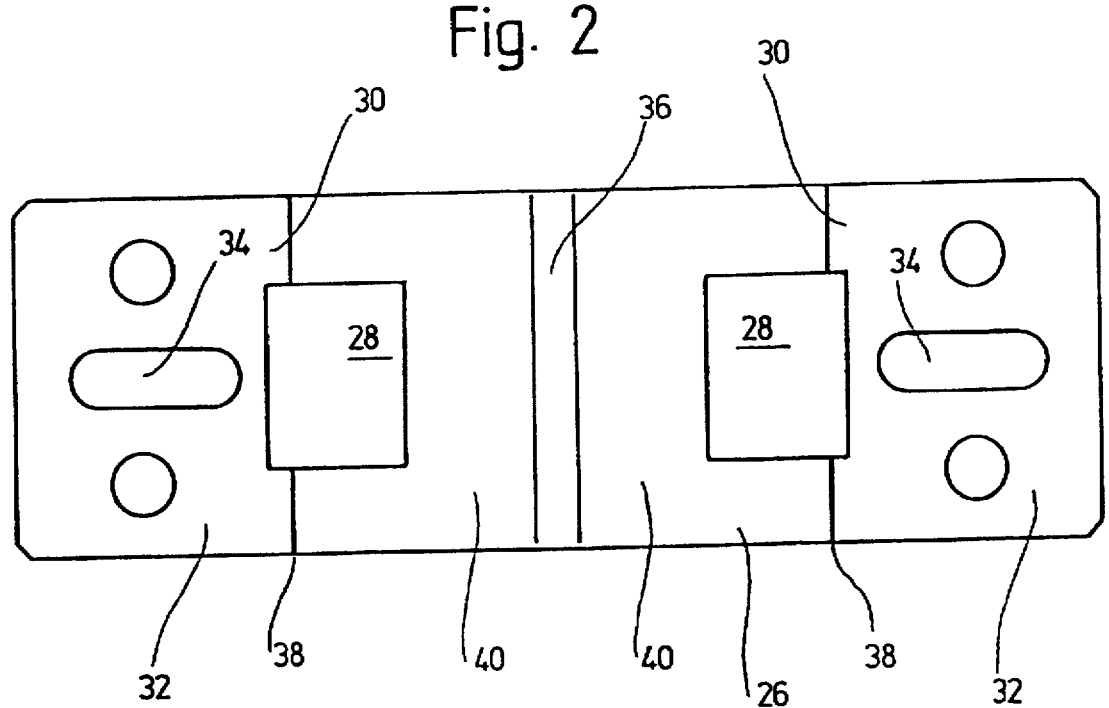
Fig. 2
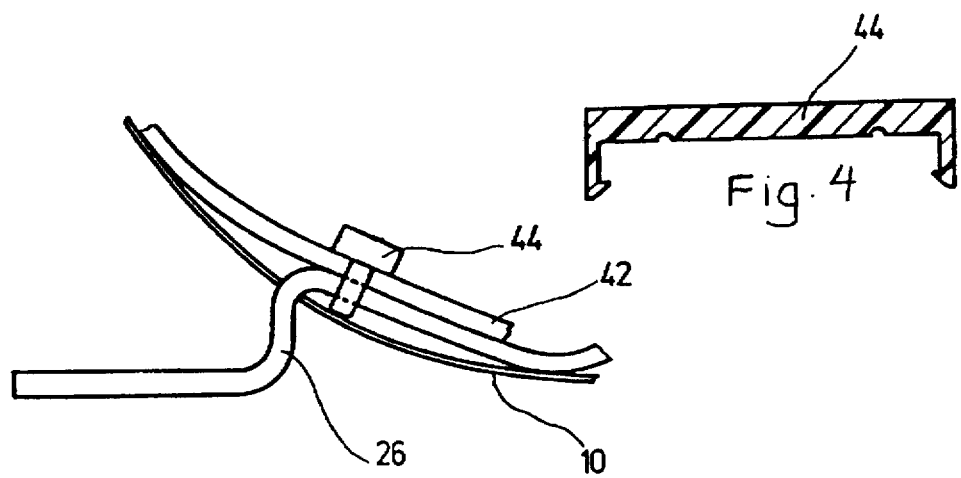
Fig. 4
Fig. 3

5,704,574

CLAMPING RING WITH HOLDING AND SUPPORTING STRAPS

FIELD OF THE INVENTION

The present invention relates to a clamping ring having a flexible holding strap with a pivotal locking mechanism. A holding assembly is provided with two apertures for the ingress of the holding strap. The apertures are arranged in the vicinity of a reorientation point, where the end of the holding member is converted into a foot or pedestal part. A supporting strap at least partially engages along the holding strap and is turned toward the inside of the clamping ring.

BACKGROUND OF THE INVENTION

A clamping ring of this type is disclosed in European Patent 0 508 050 A3. Two apertures are present in the holding member for the engagement of the holding strap, are configured essentially rectangular, and are on a common side of the holding member open to the outside atmosphere. With an already stationary holding member, the holding strap can be fixed by introduction from the side into both of the apertures, while remaining secure on the holding member. Both of the apertures are arranged in the vicinity of a reorientation point, at which the end of the holding member is converted into a foot part for fixing the clamping ring on buildings and stationary machine parts. The clamping ring opening intended to receive a pipe or the like can be opened wide and can be locked securely by means of the pivotal locking mechanism. The elasticity of the holding strap, which is clamped securely in both of the apertures, permits the known clamping ring holding strap to move longitudinally in the apertures only with difficulty. This difficult movement limits the capacity for adjustment or adaptation of the known clamping ring to predetermined structural parameters. The supporting strap is arranged alongside and connected with the holding strap. The holding strap is subdivided into two halves in the area of the holding member. The supporting strap insulates of the body to be carried.

U.S. Pat. No. 3,632,069 discloses permanent fixation of tubular bodies and longitudinal movement of the holding strap. The strap is arranged in tunnel-like closed apertures in the holding member. The holding member alone has a trough-like receiving part with a level bottom and two upright sides. The upright sides limit the holding possibilities for this known clamping ring intended for the most varied types of tubular bodies which are to be held. Therefore, when longitudinal movement of the holding strap occurs in the closed apertures of the holding member, the holding strap does not remain in this thrust position. This considerably decreases the so-called user friendliness for assembly of this known clamping ring. Because of structural parameters, the locking mechanism requires that different positions be assumed around the outer periphery of the clamping ring.

SUMMARY OF THE INVENTION

Objects of the present invention involve providing a clamping ring which can be adjusted or adapted so that a plurality of different types of members, especially tubular bodies, can be held in the clamping ring even at points with cramped structural space, and which is user friendly in its assembly.

The foregoing objects are basically obtained by a clamping ring comprising a flexible holding strap having free ends, a pivotal locking mechanism coupled to the holding strap adjacent its free ends, and a holding member. The holding member has a middle bearing part between foot parts at opposite ends of the holding member and has reorientation points between ends of the middle bearing part and the foot parts. The middle bearing part has a central breakpoint. First and second apertures are in and are completely surrounded by the holding member. The apertures receive the holding strap and are located at the reorientation points. A supporting strap at least partially engages the holding strap and faces an interior of the clamping ring. The breakpoint engages the holding strap and is arranged between the holding strap and the supporting strap. The supporting strap engages portions of the holding strap between the apertures and the free ends, and is connected with the holding strap adjacent its free ends.

By forming the clamping ring in this manner, the flexible holding strap can be moved longitudinally within the holding member and held in a set position such that the locking mechanism can be moved longitudinally, as desired, along the curve of the clamping ring. This arrangement provides a complete range of possibilities of placement of the clamping ring, even within cramped structural parameters.

A self-impedance occurs, assisted by the arrangement of the curved installation point or breakpoint between supporting and holding straps. In any assumable setting, the clamping ring strap by itself retains its assumed position to facilitate the adjustment and adaptation possibilities of the clamping ring to complicated structural parameters and to increase the user friendliness in terms of assembly. At least partially because of inherent/internal tension, a force-locking effect on the holding strap and holding member enhances their engagement with the one-piece supporting strap, with the supporting strap being connected with the holding strap in the vicinity of their free ends. The supporting strap also provides circumferential insulation of a body being carried therein. The curved installation point or breakpoint within the holding member permits the most different types of tubular bodies to be securely held within a predetermined range of diameters and to be carried within the receiving and carrying space of the clamping ring.

In one preferred embodiment of the clamping ring according to the present invention, the rectangular aperture is arranged partially in a perpendicular web of the foot part and partially in the central bearing member. The central bearing member extends in a curved or straight line between the installation point or breakpoint and the curved reorientation point. Because of this arrangement, the desired longitudinal movability and self-impedance of the flexible holding strap can be attained especially simply and with the least operational forces within the clamping ring.

In another preferred embodiment of the clamping ring according to the present invention, the breakpoint is rounded and is converted into a bearing member in the vicinity of the two foot parts. The rounded breakpoint forms an installation surface for the supporting strap in this area. As a result of the relatively extensive installation surfaces of the bearing member attained in this manner, considerable holding force on the structural part to be carried in the clamping ring can be attained.

In another preferred embodiment of the clamping ring according to the present invention, at least one connecting part of the clamping ring is configured in the form of a clip having a latch part extending along the edges of the supporting strap and the holding member and having a strap part in the interior of the clamping ring. Furthermore, the supporting strap is preferably arranged between the connecting part and the holding strap. Improved diameter adjustment or adaptation for the bodies to be received and held in the clamping ring can be attained by the connecting part located within the clamping ring space. In addition, the connecting part can have at least one aperture adapted to the shape of the supporting strap. This guarantees the longitudinal movability of the supporting strap relative to the holding strap in this area.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure:

FIG. 2 is a plan top view of the holding member of the clamping ring of FIG. 1;

FIG. 3 is a partial, side elevational view of the clamping ring of FIG. 1 with a connecting member configured as a latch member mounted thereon; and FIG. 4 is a side elevational view in section of the connecting member of FIG. 3.

DETAILED DESCRIPTION OF THE INVENTION

Figure 1:
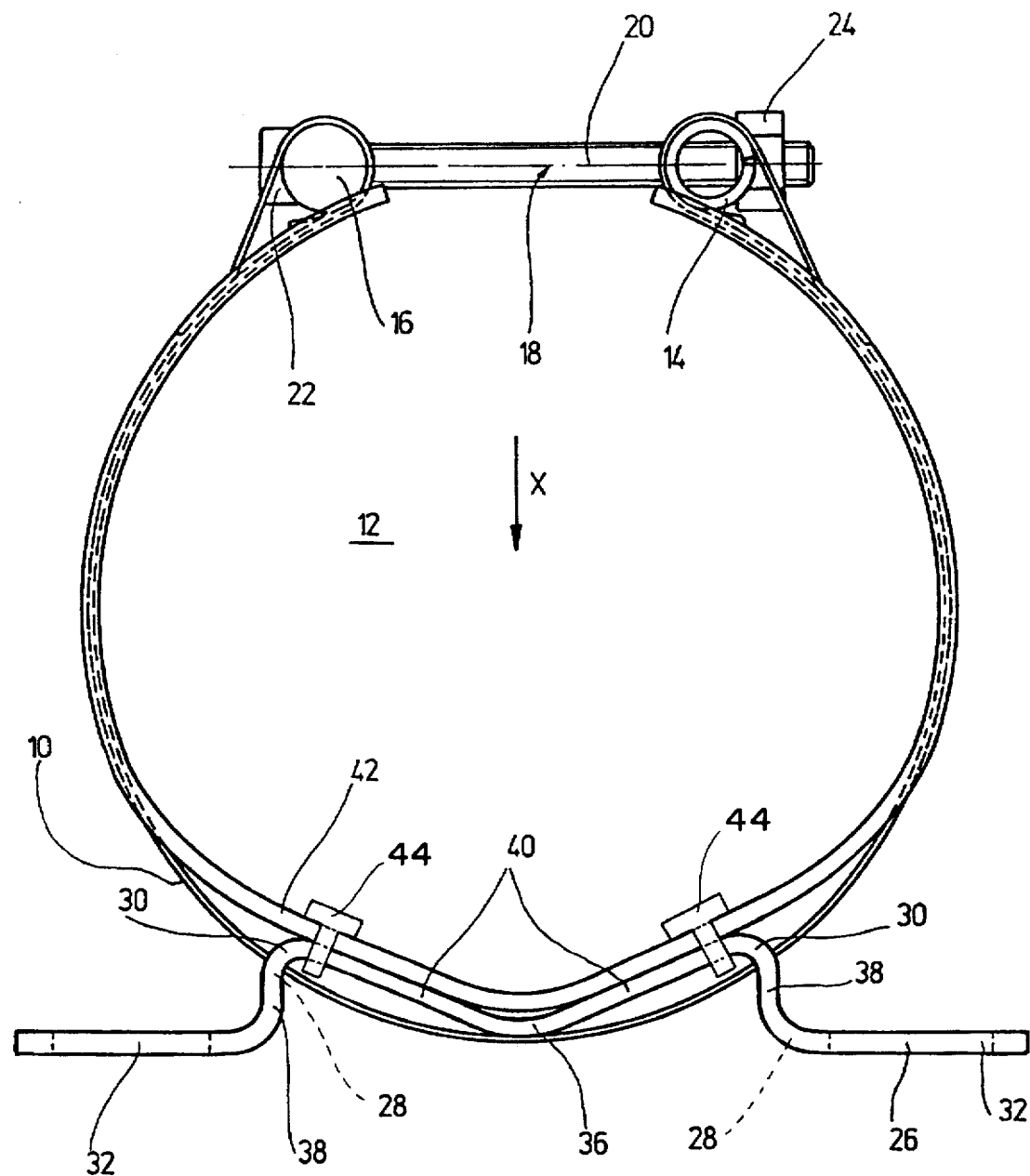
FIG. 1 is a side elevational view of a clamping ring with a holding strap and a holding member according to an embodiment of the present invention.

The clamping ring in FIG. 1 has a flexible holding strap 10 serving as clamping ring strap. Strap 10 is configured essentially circular and defines a holding space 12, in which can be fixed a tubular body (not shown). Holding strap 10 is curved at its ends and surrounds journals 14 and 16. The journals are component parts of a locking mechanism 18. Locking mechanism 18 comprises a threaded bolt 20, with a threading on its one end and a bolt head 22 on its other end. To pivot locking mechanism 18, bolt head 22 is provided with interior hexagonal space. A suitable locking mechanism is disclosed in U.S. Pat. No. 5,474,269 to Kasubke, the subject matter of which is hereby incorporated by reference.

A threaded nut 24 can be screwed onto the threading of bolt 20. The nut facilitates longitudinal adjustment of bolt 20. Holding strap 10 is longitudinally divided in the vicinity of journals 14 and 16. Journal 16 has an oval aperture (not shown) which opens upwardly and which allows the engagement of bolt 20 from above for execution of the rapid closing. For pivoting of bolt 20, journal 14 is mounted rotatably within the bent-over end of the holding strap.

The clamping ring has a holding member 26 with two apertures 28 for the ingress of holding strap 10. The apertures are each arranged in the vicinity of a reorientation point 30, where holding member 26 is converted at each end into a foot or pedestal part 32. For securing holding member 26 on a solid base, the two foot parts 32 can be provided with longitudinal boreholes 34 or the like. As shown especially in FIG. 2, the two apertures 28 configured to be essentially rectangular, and are completely surrounded by holding member 26. Holding member 26 has a rounded breakpoint 36 (i.e., a break in the curve) in its middle portion extending in the direction of the two foot parts. The holding member middle portion can also be adapted to a differently shaped body to be received and held. Instead of breakpoint 36, a partially cylindrical installation curve (not shown) can be provided.

Each aperture 28 is located partially in a perpendicular web part 38 of the associated foot part 32 as well as in an associated bearing member 40. Bearing members 40 extend in straight lines between breakpoint 36 and curved reorientation points 30. Holding strap 10 in turn is associated with the two foot parts 32 and with breakpoint 36 in the installation, as is shown particularly in FIG. 1. Breakpoint 36 is arranged between holding strap 10 and a supporting strap 42 of flexible rubber. Following the extension of holding strap 10 from the two apertures 28, strap 10 is in contact with supporting strap 42. Supporting strap 42 can be somewhat wider than holding strap 10. At least at the ends, supporting strap 42 is clamped securely through suitable openings or notches in the elastic strap to holding strap 10 and is fixed in this assembly. By virtue of this construction, holding strap 10, together with supporting strap 42, can be freely movable longitudinally in both directions within apertures 28. In each adjustment movement, the two straps 10 and 42 hold their position by themselves because of their elasticity and the tension inherent between holding strap 10 and supporting strap 42. Thus, locking mechanism 18 can be opened and closed in any of the assumed positions.

As shown in FIGS. 3 and 4, at least one connecting member 44 can be provided configured as part of a snap-latch assembly. In the vicinity of holding member 26, the snap-latch assembly comprises the supporting strap 42, which is thus securely fastened in the interior 12 of the clamping ring projecting over holding member 26. Thus, the connecting member facilitates another diameter or height adaptation within clamping ring space 12 without interrupting or negatively influencing the longitudinal movability of the holding and supporting straps. Connecting member 44, as shown particularly in FIG. 4, can be provided with longitudinal channels receiving supporting strap 42 and guaranteeing the longitudinal movability of holding strap 10 and supporting strap 42, even when connecting assembly 44 is securely mounted on foot part 26.

While a particular embodiment has been chosen to illustrate the invention, it will be understood by those skilled in the art that various changes and modifications can be made therein without departing from the scope of the invention as defined in the appended claims.

What is claimed is:

1. A clamping ring, comprising:

a flexible holding strap having free ends;

a pivotal locking mechanism coupled to said holding strap adjacent said free ends;

a holding member having a middle bearing part between foot parts at opposite ends of said holding member and having reorientation points between ends of said middle bearing part and said foot parts, said middle bearing part having a central breakpoint and two planar portions extending angularly relative to each other from said breakpoint, said foot parts having perpendicular web parts;

first and second apertures in and completely surrounded by said holding member, said apertures receiving said holding strap and being located at said reorientation points, each of said apertures being generally rectangular and being partially located in one of said web parts and partially located in said middle bearing part; and a supporting strap at least partially engaging said holding strap and facing an interior of the clamping ring, said breakpoint engaging said holding strap and being arranged between said holding strap and said supporting strap, said supporting strap engaging portions of said holding strap between said apertures and said free ends and being connected with said holding strap adjacent said free ends.

2. A clamping ring according to claim 1 wherein said breakpoint is rounded; and said middle bearing part engages and supports said supporting strap between said foot parts.

3. A clamping ring according to claim 2 wherein at least one connecting member engages and couples said supporting strap and said holding member, said connecting member having a strap part in said interior of the clamping ring and a snap-latch part extending around edges of said supporting strap and said holding member, said supporting strap being between said connecting member and holding member.

4. A clamping ring according to claim 1 wherein at least one connecting member engages and couples said supporting strap and said holding member, said connecting member having a strap part in said interior of the clamping ring and a snap-latch part extending around edges of said supporting strap and said holding member, said supporting strap being between said connecting member and holding member.

5. A clamping ring according to claim 1 wherein said breakpoint is curved.

* * * * *